April 21, 1942.   R. H. OUNSWORTH   2,280,197
FISH LURE
Filed June 28, 1940
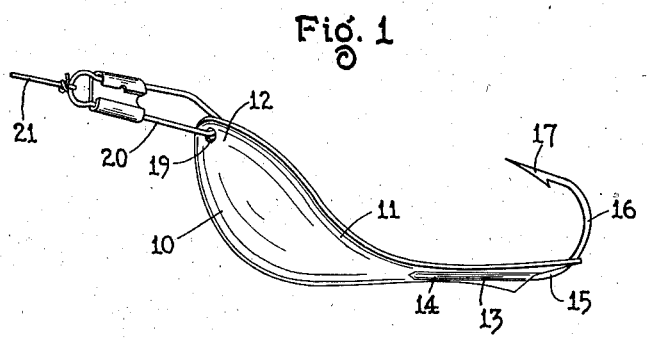
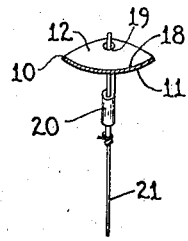
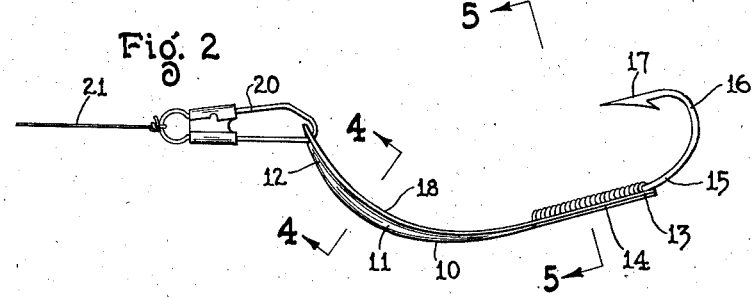
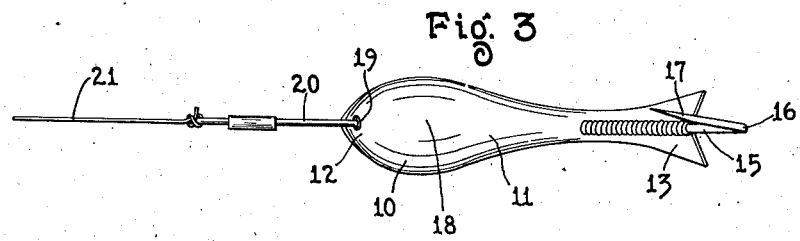
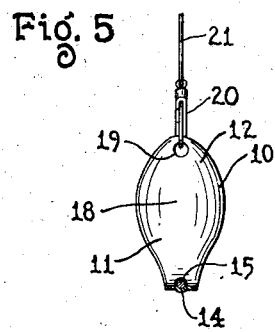
Inventor
Richard H. Ounsworth
By Caswell & Lagaard
Attorneys Patented Apr. 21, 1942

2,280,197

UNITED STATES PATENT OFFICE 2,280,197

FISH LURE

Richard Herbert Ounsworth, Minneapolis, Minn.

Application June 28, 1940, Serial No. 342,961

1 Claim. (Cl. 43—42)

My invention relates to fish lures and has for an object to provide a fish lure capable of readily attracting fish.

An object of the invention resides in providing a lure adapted to oscillate alternately in a clockwise and counter-clockwise direction as the same is drawn through the water to simulate the action of a crippled fleeing minnow.

Another object of the invention resides in providing a fish lure which is extremely simple and practical in construction.

A still further object of the invention resides in providing a fish lure which will not readily become caught in weeds.

An object of the invention resides in providing a fish lure in which the hook is rigidly secured to the body member of the lure.

A still further object of the invention resides in providing a fish lure comprising a body member in the shape of a fish so as to readily attract the fish to be caught.

A feature of the invention resides in constructing the body member in the form of a spoon, particularly at the intermediate portion thereof, and in bending the said body member transversely so that the head of the body member makes an appreciable angle with the tail.

An object of the invention resides in providing a hook rigidly secured to the tail of the body member and in further providing means for attachment to a line at the head of the body member, and in off-setting the second named means from the tail of the body member a distance substantially equal to the width of the hook.

A feature of the invention resides in bending the body member so that the head and tail make an angle of between ninety degrees and one hundred twenty degrees with respect to each other.

Another object of the invention resides in providing a fish lure which can be constructed of small dimensions so as to permit of using the lure for casting with a fly rod to permit fishing trout and other small fish.

Other objects of the invention reside in the novel combination and arrangement of parts and in the details of construction hereinafter illustrated and/or described.

In the drawing:

Fig. 1 is an enlarged perspective view of a fish lure illustrating an embodiment of my invention.

Fig. 2 is a side elevational view of the structure shown in Fig. 1.

Fig. 3 is a plan view of the structure shown in Fig. 2.

Fig. 4 is a cross sectional view taken on line 4—4 of Fig. 2.

Fig. 5 is a cross sectional view taken on line 5—5 of Fig. 2.

I have found by experiment that, where the fish lure oscillates alternately in one direction and then in the other rather than spins or completely rotates, the same simulates in action the movements of a crippled fleeing minnow and offers great attraction to the fish. The present invention provides a construction which utilizes this principle and by means of which highly improved results are procured.

My invention comprises a body member 10 which is constructed in the shape of a fish having an intermediate portion 11, a head 12, and a tail 13. The intermediate portion 11 of the body member 10 is bent transversely so as to cause the head to make an angle with the tail of between ninety and one hundred twenty degrees. In addition, the body member 10, particularly at the intermediate portion 11 thereof, is formed like a spoon to provide a concavity 18 on the side of said body member included in the bight formed by the transverse bend.

The tail 13 of the body member 10 has a groove 14 therein which merges with the concavity 18. In this groove is disposed the shank 15 of a fish hook 16 which has the usual barbed point 17. Shank 15 is secured to the tail 13 by soldering or otherwise. The hook 16 is arranged so that the point 17 thereof faces away from the tail 13.

At the head 12 of the body member 10 is formed an eye 19 through which a fastener 20 may be inserted which is adapted to be secured to a line 21. This fastener forms a loose connection between the body member 10 and the line which permits the fish lure to move laterally and to oscillate when traveling through the water. The body member 10 is so bent that the concavity 18 lies in the bight formed between the head 12 and tail 13 and the said bend is so formed that the eye 19 is off-set from the tail 13 an amount substantially equal to the width of the hook 16.

The manner of using the invention is obvious. When hooked to the line 21 and drawn through the water the hook 16 assumes the position shown in Fig. 2. Due to the off-set of the head with respect to the tail and due to the spoon-like form of the body member, the body member oscillates alternately in a clockwise and counter-clockwise direction. This attracts the fish which readily bite when the fish lure is in use. The body member 10 is preferably constructed of sheet metal which is plated and highly polished to give to the device a bright appearance which assists in attracting the fish. When the rate of movement of the lure is slow the body 10 does not oscillate but assumes the position shown in Figs. 1 and 2 with the hook up. In this position the lure will drag through weeds without the hook becoming caught.

While my invention may be made in various sizes, I found that it is particularly valuable when constructed sufficiently small for casting with a fly rod to permit of fishing trout and other small fish. When constructed for this purpose the blank from which the body member is made can be approximately one inch long and approximately one quarter inch wide and otherwise proportioned according to the drawing.

My invention is exceedingly simple in construction and can be manufactured at an extremely low cost. The fish lure operates in an exceedingly effective manner and produces results which I have been unable to attain with any other type of fish lure. The lure has a lively oscillating action and does not twist the line or leader. The lure simulates in action the movements of a crippled fleeing minnow. When the lure is not in action the body is disposed in a manner to hold the hook up, thus preventing the hook from catching in weeds.

Changes in the specific form of my invention, as herein disclosed, may be made within the scope of what is claimed without departing from the spirit of my invention.

Having described my invention, what I claim as new and desire to protect by Letters Patent is:

A fish lure comprising a body member in the shape of a fish having a head, a tail and an intermediate portion, said body member being relatively straight at the tail and being curved longitudinally intermediate its ends to form a bight on the inside thereof at the intermediate portion of the member to cause the tail of the body member to make an angle with respect to the head thereof of between ninety and one hundred twenty degrees, said body member being curved transversely at the vicinity of said bight to form an arcuate concavity in the body member disposed on the same side as said bight, means at the head of the body member for attaching it to a line, and a hook at the opposite end of the body member, said hook having a shank following along said tail and a point extending outwardly from the inside of the body member.

RICHARD HERBERT OUNSWORTH.